INVENTORS
MICHEL AUBERT
SEBASTIEN FOGLIA AND
ROLAND ROCHE

BY Cameron, Kerkam + Sutton
ATTORNEYS

United States Patent Office

3,100,743
Patented Aug. 13, 1963

3,100,743
SYSTEM FOR SUPPORTING NUCLEAR FUEL
IN ATOMIC REACTORS
Michel Aubert, Paris, Sebastien Foglia, Verrieres-le-Buisson, and Roland Roche, Clamart, France, assignors to Commissariat a l'Energie Atomique, Paris, France
Filed Nov. 19, 1959, Ser. No. 854,155
Claims priority, application France Nov. 22, 1958
5 Claims. (Cl. 204—193.2)

This invention relates to a system for supporting nuclear fuel in an atomic reactor of the type having vertical ducts.

Various types of nuclear reactors in current use utilize vertical ducts formed in a moderator structure. The nuclear fuel elements are placed in these ducts in stacked relationship, so that each fuel element supports the weight of all the overlying elements in the stack. Various systems have been proposed for supporting and retaining the fuel elements within the ducts, and such supporting means have assumed four principal forms.

In a first form, each fuel element is provided with pivoted latching projections adapted to spread out as the element is rested upon the element immediately underlying it. This arrangement is unsatisfactory because it requires the use of pivotal connections which are apt to be short-lived under the high-temperature and radioactive conditions involved.

In a second form of nuclear fuel support, each fuel element comprises a strong internal armature adapted to withstand the weight of the overlying elements. Here many and serious difficulties are raised in manufacture and also in connection with expansion in use.

In yet another form of known nuclear fuel supporting means, each fuel element is supported on a shoulder or shelf formed at the lower end of an external armature or casing, by way of a base structure in the form of cooling fins. This has the disadvantage of substantially disturbing the flow of fluid at the ends of the fuel elements and is only applicable provided both the casing and the fin structure have a high mechanical strength under the high-temperature conditions encountered.

In yet a further known supporting system, each fuel element is contained within an outer armature or casing and is connected therewith by way of a rigid stirrup-like member at the top of the element. This member must be made of a rigid material having low neutron absorption characteristics. Such materials however are usually fragile, so that the assembly has low impact strength and must be handled gently, which raises serious difficulties and increases the complication and cost of the handling equipment, without entirely eliminating the danger of breakage.

It is an object of this invention to provide a system for supporting nuclear fuel elements, in nuclear reactors of the type using vertical ducts, which will eliminate the above difficulties in that each nuclear fuel element will be made to support only its own weight without involving the use of relatively complicated mechanical means.

According to the invention, a nuclear fuel element is retained transversely in its duct by means of fins or vanes adapted to rest upon a peripheral armature or casing made out of a material having low neutron absorption, and supporting means for the element are provided which comprise a member made of a material having low neutron absorption which is connected with said armature by way of one or more strong flexible wire-like elements, while further a groove is preferably provided at the top of the armature for facilitating the handling of the assembly comprising the element, support and armature as a unit.

According to the invention, the application of compressional loads upon the element is avoided by the provision of the armature externally surrounding the element and made of a material having low neutron absorption. The fuel element rests upon a support made of a similar low neutron absorption material. This support in turn is suspended from the outer armature by way of one or more wires made of a high tensile material. Because of the low volume and cross section of these suspension wires, they can be made from a material having a substantially high neutron absorption. The wires may be pretreated as by a cold-working step effected by causing the wires to support a load substantially greater than the weight of the fuel element before the element is mounted in its armature.

As stated, the armature is desirably formed with a peripheral groove near its top to facilitate grasping it with a clamp or the like, so that the fuel element even during handling operations will not be subjected to more than its own weight.

The invention achieves a number of highly advantageous results. Since each fuel element only supports its own weight, its casing has no mechanical function to perform. This facilitates and reduces the cost of manufacturing and assembly. The support for the element is not fragile because of the flexibility of the supporting system. The fuel element can be handled without being removed from its armature. The supporting member or stirrup only exerts a low drag against fluid flow, thereby minimizing the pressure drop past the element.

With reference to the accompanying drawings, an exemplary embodiment of the supporting system will now be described without limitative intent. In the drawings:

FIGS. 4 and 5 show two exemplary patterns of supporting wires usable according to the invention.

Figure 1:
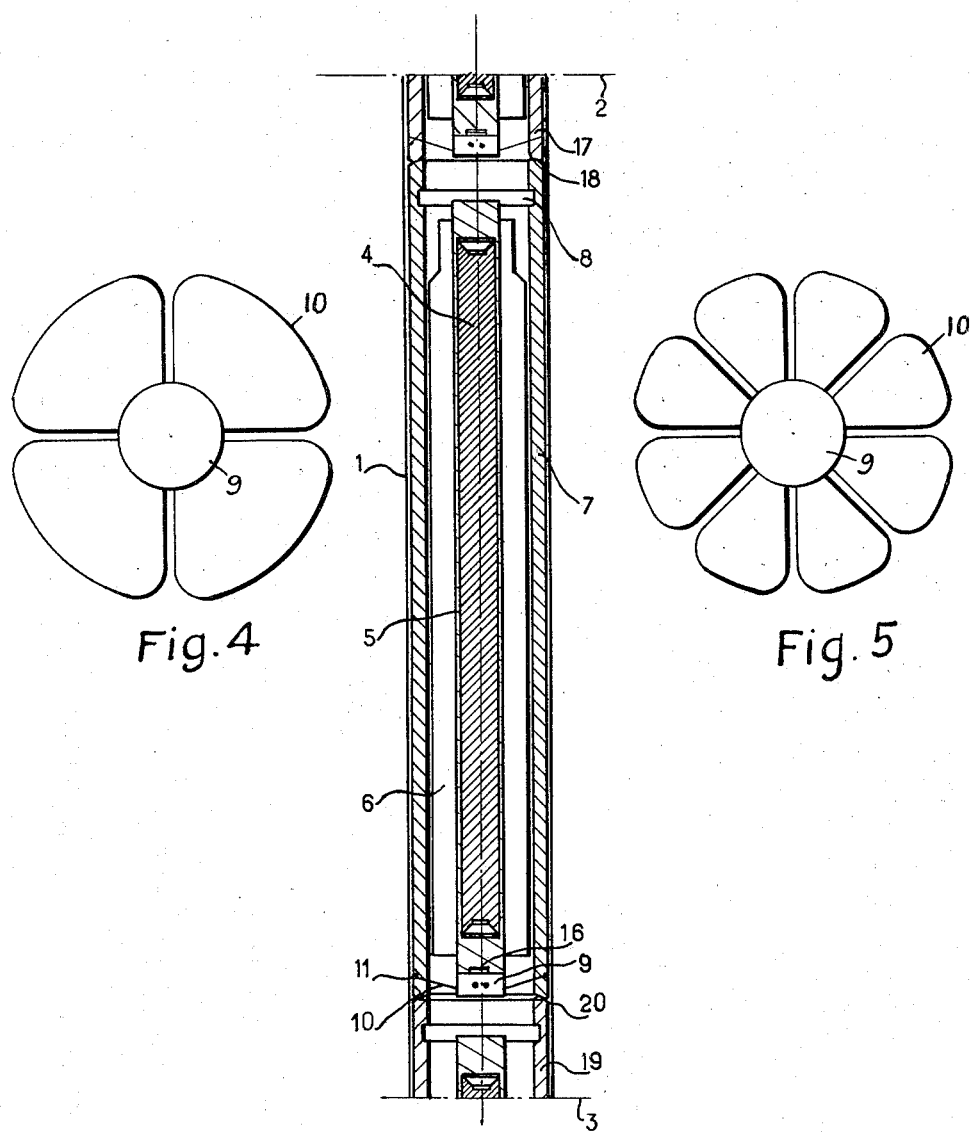
FIG. 1 is a simplified view in vertical axial section of a nuclear fuel element with its improved supporting means.

As shown in FIG. 1, a vertical duct 1 formed in the moderator structure of a nuclear reactor is shown limited to the section between the two spaced horizontal planes 2 and 3. The fuel element comprises a core of fissile material 4 surrounded with a cladding 5 including the longitudinal fins 6 which in turn is completely surrounded by the armature 7. This armature 7 is a cylindrical tubular liner made of graphite and is formed near its top with a circumferential inner groove 8 for handling the element during loading and unloading operations.

The fuel element rests at its base upon a cylindrical support 9 made of graphite. This support is suspended from the armature 7 by way of a wire 10 made of stainless steel extending through the support and wound around the armature 7 in a lateral groove 11 formed therein.

Figure 2:
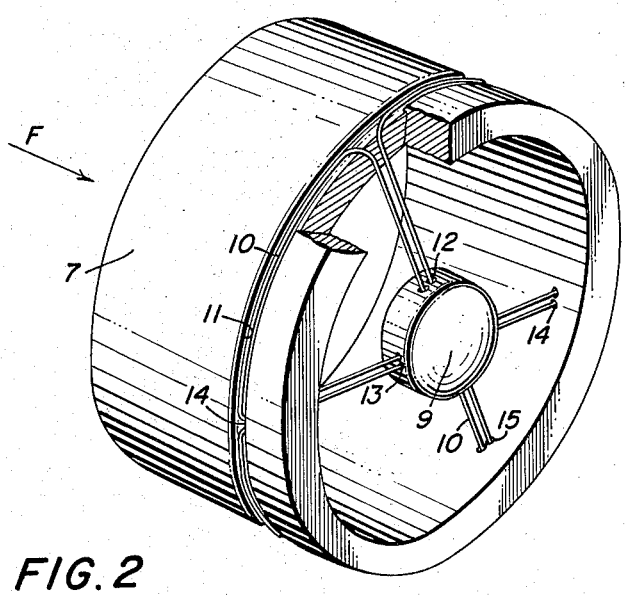
FIG. 2 is a perspective view, partly exploded and with parts cut away, showing the lower end of the surrounding armature or casing of FIG. 1, provided with the supporting means of the invention.
Figure 3:
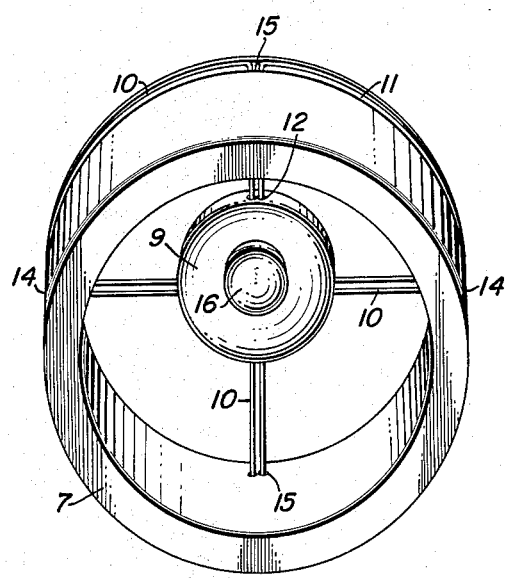
FIG. 3 is a front perspective view of the same supporting means substantially as seen along arrow F of FIG. 2.

FIGS. 2 and 3 show in greater detail the manner in which the cylindrical support 9 is secured to the liner 7. The support 9 is formed with two sets of through passages 12 and 13 which, when the element is in the position shown in FIG. 1, will be understood to lie in spaced horizontal planes. The two sets of passages 12 and 13 are at right angles in the described embodiment, and are in alignment with two sets of ports 14 and 15 formed in armature 7. In the construction shown in FIGS. 2 and 3, the single wire 10 is coiled in a "four-leaved clover" pattern, see FIG. 4, across the cylindrical support 9 and armature 7 and along the lateral groove 11 in armature 7. The cylindrical support 9 is at the centre of the sattern and is provided at one of its faces with a projecting pin 16, visible in FIGS. 1 and 3, for centering the fuel element resting on the support 9.

The armature 7 (FIG. 1) supports the armature 17 overlying it, being in engagement therewith along portions of spherical surfaces 18 and, similarly, the immediately underlying armature 19 supports the armature 7 by engagement therewith over the portions of spherical surfaces 20.

In the selected example, the wire 10 is made of stainless steel but clearly other suitable metals and alloys may be used. Such materials should be such that the resulting neutron absorption will not result in a reduction of the reactivity rate of the reactor by a factor of more than about 75 pcm. and should retain high mechanical strength under the prevailing conditions. Molybdenum, iron, chrome, nickel and brass are examples of suitable materials for the supporting wires.

Various winding patterns may be used for the suspending wires of the invention other than the four-looped pattern described above. Thus patterns with a plurality of loops symmetrically disposed around the center of the cylindrical support 9 may be used, and FIG. 5 illustrates one such pattern in which there are eight loops.

We claim:

1. In a support for fuel elements in a heterogeneous atomic pile having a solid moderator structure with vertical ducts therein, a hollow tubular armature section within a duct, a fissionable fuel element spaced from and within said armature section, a cylindrical piece within and spaced from said armature section adjacent the lower end thereof, wire elements extending from said piece to said armature section, said fuel element resting on said piece, said flexible wire elements being the sole support for the weight of said fuel elements and of said piece, and means for centering said fuel element in said armature section.

2. Apparatus as described in claim 1, said wire elements comprising loops with a common center of symmetry in the axis of said piece, an external circumferential groove in said armature section, a portion of each loop resting in said groove and two radial parts for each loop connecting the respective portion of said loop to said piece.

3. Apparatus as described in claim 2 in which said wire elements are parts of a single wire and said radial parts of said loops pass through said piece along diameters of said piece at right angles to each other.

4. Apparatus as described in claim 3 having four loops, said radial parts passing through said piece in parallel pairs.

5. Apparatus as described in claim 1 including a centering pin on said piece engaging said fuel element.

References Cited in the file of this patent

FOREIGN PATENTS

| | | |
|---|---|---|
| 784,890 | Great Britain | Oct. 16, 1957 |
| 791,011 | Great Britain | Feb. 19, 1958 |
| 794,981 | Great Britain | May 14, 1958 |
| 802,805 | Great Britain | Oct. 15, 1958 |
| 802,806 | Great Britain | Oct. 15, 1958 |
| 217,980 | Australia | Oct. 27, 1958 |
| 1,064,161 | Germany | Aug. 27, 1959 |

OTHER REFERENCES

Nuclear Power, February 1957, pages 47–47. Copy in Scientific Library.

"Nuclear Fuel Elements," Hausner, Reinhold Publishing (1959), pp. 28 and 46, 47. Copy in POSL.